No. 119,152. Patented Sep. 19, 1871.

F. Jones, Comb<sup>nd</sup> Hand Cart & Potato Digger.

Witnesses:
C. Raettig
Wm. H. C. Smith

Inventor:
F. Jones.
per
Attorneys.

UNITED STATES PATENT OFFICE.

FRANKLIN JONES, OF TERRE HAUTE, ILLINOIS.

IMPROVEMENT IN POTATO-DIGGERS.

Specification forming part of Letters Patent No. 119,152, dated September 19, 1871.

*To all whom it may concern:*

Be it known that I, FRANKLIN JONES, of Terre Haute, in the county of Henderson and State of Illinois, have invented an Improved Potato-Digger; and I do hereby declare that the following is a full, clear, and exact description thereof, which will enable others skilled in the art to make and use the same, reference being had to the accompanying drawing forming part of this specification, in which—

Figure 1:
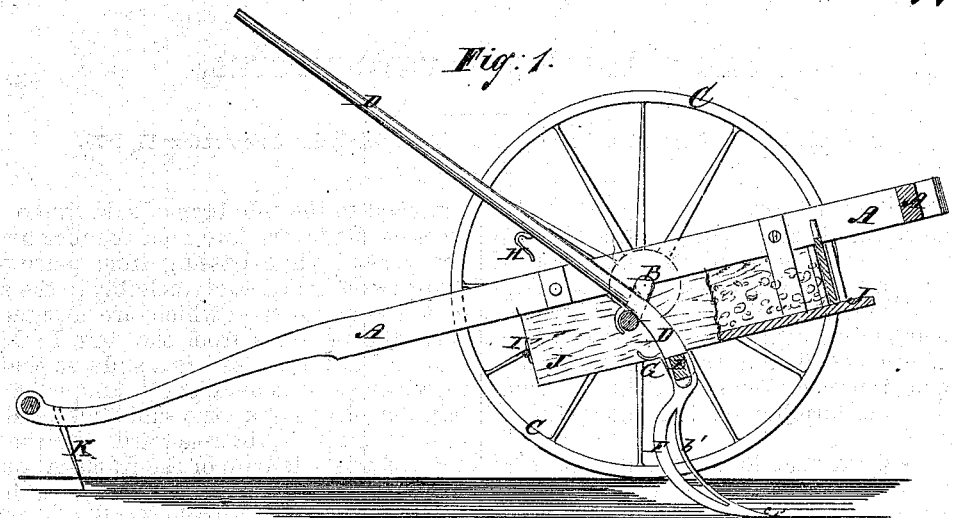
Figure 2:
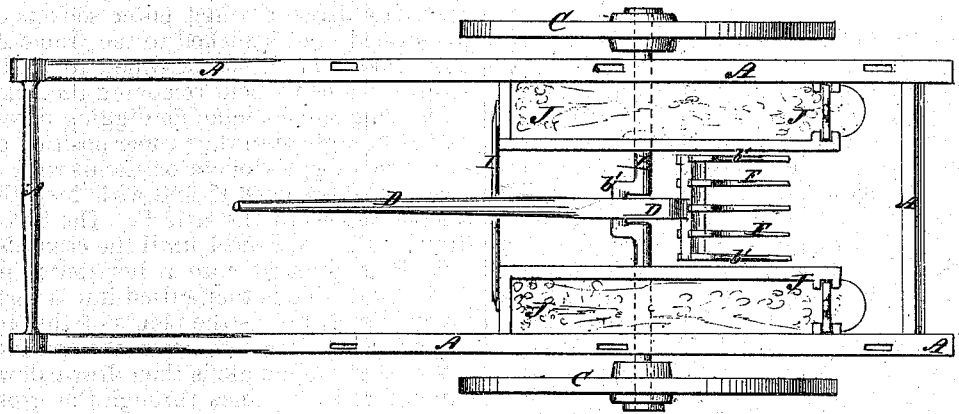
Figure 3:
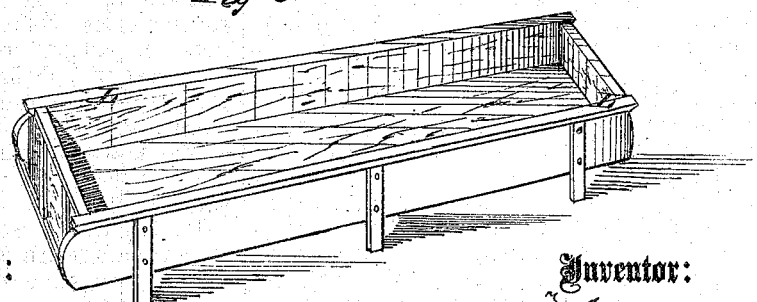

Figure 1 is a vertical longitudinal section of my improved machine, part of one of the receiving-boxes being broken away to show the construction, and the cart-body being removed. Fig. 2 is a top view of the same, the cart-body being removed. Fig. 3 is a perspective view of the cart-body.

Similar letters of reference indicate corresponding parts.

My invention relates to potato-diggers; and consists in the new arrangement of parts hereinafter described and subsequently claimed.

A is the frame of the machine, in bearings attached to the side bars of which the axle B works. C are the wheels, which revolve upon the journals of the axle B. In the middle part of the axle B is formed a double crank, $b'$, to receive the fork-handle D. To the lower end of the handle D is attached a cross-bar, E, sixteen inches (more or less) in length, to which are attached the tines F, which are made curved, and the rear ends of which are slotted or forked to receive the cross-bar E, to which the said tines may be secured by bolts or rivets. By this construction, should one of the tines F be broken it can be readily detached and welded or replaced by a new tine. The side tines F have guards $f'$ (one or more) formed upon them, extending across their bend from their forward to their rear part, as shown in Fig. 1, to prevent the potatoes from rolling off at the sides of the fork. To the under side of the lower part of the handle D are attached two stops, G, of such a form as to fit upon the crank $b'$ of the axle B. The stops G are placed facing each other, and at such a distance apart that the fork may have the necessary play and that the fork may be conveniently detached from said crank. To the under side of the middle part of the handle D is attached a hook, H, in such a position that when the fork has been raised into a horizontal position the said hook may be slipped upon a rod, I, extending across the frame A, and the ends of which are attached to the side bars of said frame or to the ends of the boxes J, to hold the fork away from the ground while passing from place to place. J are boxes attached detachably to the side bars of the frame A, and which are designed to receive the potatoes from the fork D E F. The rear end of the boxes J is a slide, so that the potatoes may be conveniently dumped from said boxes by drawing up the said slides and tipping the cart-frame to the rearward. To the forward ends of the side bars of the frame A, at or near the ends of the forward cross-bar or handle of the said frame, are attached spikes K, which are designed to enter the ground and hold the cart steady while the fork is being used. L is the box or body of the cart, the lower ends of the stakes or cleats of which enter sockets or keepers formed in or attached to the frame A. The box or body L may be attached to the frame A either with or without removing the boxes J.

In using the machine for digging potatoes the cart is brought into the proper position over the hill to be dug; the operator stands with one foot between the spikes K and with his other foot advanced toward the axle B. The fork is then drawn to the rearward until the crank $b'$ of the axle B is brought into a horizontal position. The fork-handle is then raised into a vertical position, which brings the points of the tines into the proper position to enter the ground. The rear end of the handle is then drawn downward, which forces the tines through the ground beneath the hill and raises the potatoes from the ground. A few rapid lateral movements of the rear end of the fork-handle shakes the dirt from the potatoes. The fork is then raised and the potatoes poured into one of the boxes J.

In case it is desired to have the potatoes lie for a time upon the ground to dry they may be allowed to fall from the fork to the ground. When sufficiently dry the potatoes may be gathered from the ground, by means of the fork, with great rapidity.

Having thus described my invention, I claim as new and desire to secure by Letters Patent—

The arrangement of crank-shaft B $b'$, fork D F, and potato-receptacles J J upon wheels C C, as and for the purpose specified.

FRANKLIN JONES.

Witnesses:
A. H. MAGIE,
W. K. SMITH.